UNITED STATES PATENT OFFICE.

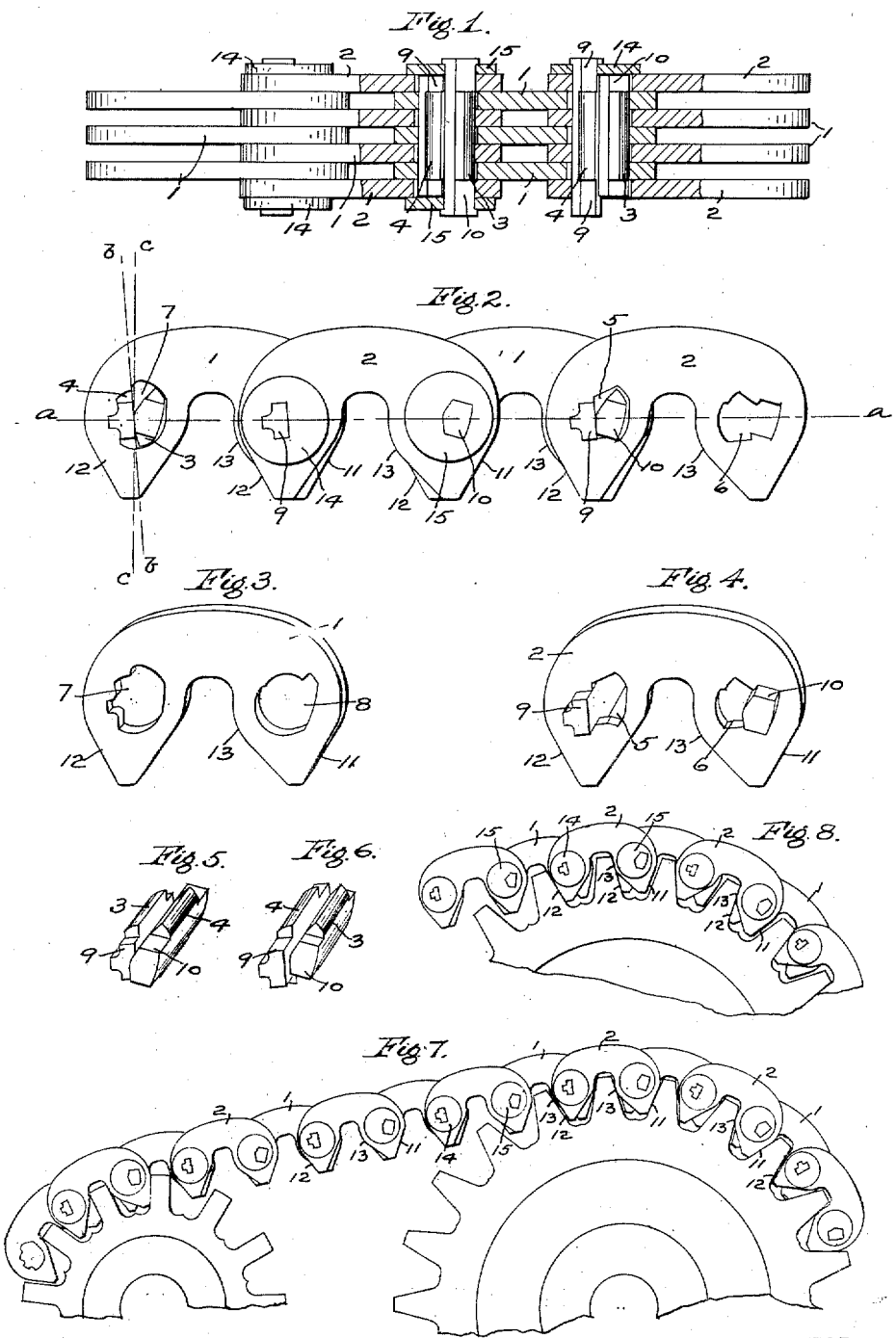

FRANK L. MORSE, OF ITHACA, NEW YORK, ASSIGNOR TO MORSE CHAIN COMPANY, OF ITHACA, NEW YORK, A CORPORATION OF NEW YORK.

MULTIPLATE DRIVE-CHAIN.

989,719.   Specification of Letters Patent.   Patented Apr. 18, 1911.

Application filed June 27, 1908.   Serial No. 440,731.

*To all whom it may concern:*

Be it known that I, FRANK L. MORSE, a citizen of the United States, residing at Ithaca, in the county of Tompkins and State of New York, have invented new and useful Improvements in Multiplate Drive-Chains, of which the following is a specification.

This invention relates to drive chains for power transmission and more particularly to the multi-plate type of chain in which the links are composed of a plurality of plates adapted to arch over the sprockets, and the links being joined by two part pintles comprising a seat pin and rocker, as covered in my prior Patent No. 799,072 of Sept. 12, 1905. According to this prior construction the links are formed to engage the sprockets at only one end of the links, while the opposite ends of the links run free from contact with the teeth of the wheels; the seat pin members of the pintles are also arranged with their bearing surfaces substantially at right angles to the line of the pull and all facing in the same direction. This prior construction of chain has been designed to run more particularly in one forward direction, and in case of a reversal of the stress and direction of running, there is sometimes a tendency for the chain to ride out and slip over the top of the sprockets.

One of the objects of my present invention is therefore to correct this tendency, and also to increase the durability of the chain and diminish the wear upon the sprockets. This feature of my improvement comprises the forming of the plates comprising the links with external sprocket engaging surfaces at both ends and an internal sprocket engaging surface at one end, this latter preferably extending slightly beyond the external engaging surfaces of the plates of the adjacent link in order that it may readily wear down to a plane coinciding with the plane of such external engaging surface as used on the respective sizes of sprocket wheels.

Another object of my invention is to prevent the slipping of one part of the pintle across the face of the other part due to transverse stress which may be caused by the lever action of a link when engaged by a driving sprocket or by a reversal of stress in the chain, and this feature comprises a slight tipping of the seat pin member of the pintle so that the plane of its bearing surface shall be at a slight angle, about three or five degrees, from the perpendicular to the line of pull.

Another object of my invention is to provide improved means for riveting the joints of the chain together where two part pintles are used, and for this purpose, outside washers may be riveted to the member of the pintle carried by the outside plates of the link at each joint so that there will be no relative movement between the outside link plates and the washers, the seat pins being extended for the washers at each alternate joint and the rocker pins at the intermediate joints.

In the accompanying drawing Figure 1 is a plan view partly in horizontal section of a few links of a chain embodying my improvements; Fig. 2 a side elevation of the same; Fig. 3 a perspective view of one of the plates of one of the intermediate links; Fig. 4 a perspective view of one of the outside plates showing the ends of the pintle parts extending through the apertures and to which the washers may be riveted; Figs. 5 and 6, perspective views of the two part pintles of two adjacent joints; Fig. 7 a side view of a portion of a chain upon a pair of sprocket wheels; and Fig. 8 a side view illustrating the engagement of the sprockets and chain after the same have become slightly worn.

The links of the chain are composed of a plurality of plates 1 adapted to arch over the sprockets, the plates of one link being preferably interspersed upon the pintles with the plates of the adjacent link and pintles formed in two parts comprising seat-pins 4 and rocker-pins 3. Each alternate link has outside plates 2 provided with apertures 5 and 6 at its ends, the aperture 5 being formed to closely fit the shouldered end 9 of the seat-pin 4 and permit free angular movement of the shouldered end 10 of the rocker-pin 3 which extends into the aperture 5. The intermediate plates 1 of all the links are provided with apertures 7 adapted to hold in place and turn with the seat-pins 4 and permit free movement of the rocker members 3, and apertures 8 at the other ends of the plates, formed to hold in place the rocker-pins 3 and provide clearance for the free movement of the seat-pins 4. The plates of each link are adapted to bear at both ends upon the sprockets and for this purpose are provided with external sprocket engaging surfaces at 11 and 12, and with an internal sprocket engaging surface at one end as at 13. The end of the link plates having the external engaging surface 11 is preferably made slightly larger than the other end having surface 12, the surface 11 being adapted to engage the teeth of the driving sprocket wheel, while the internal surface 13 and the other external surface 12 may engage the sprockets of the driven wheel.

The teeth of standard sprocket wheels are ordinarily cut of a certain shape and angle according to the diameter of wheel and the number of teeth, and the external engaging surfaces 11 and 12 of the links are so formed as to correspond with the angle of the sprockets for all the different standard size wheels. It will be evident however that the internal engaging surface 13 cannot be so formed as to conform to the angle of the bearing face of sprockets on wheels of different sizes since it must be a different angle for each different size of wheel. It is therefore preferred to form the internal engaging surface 13 rounded and extend the same slightly beyond the ends of the plates of the adjacent link having external engaging surface 12, as shown in Figs. 2 and 7, in order that the internal engaging surface may readily wear down to conform to the plane of the external engaging surface 12 during the initial service of the chain drive, as shown in Fig. 8. The bearing of the sprockets will then be upon the external engaging surfaces at both ends of each link and if there should be any reversal of stress or direction in the running of the chain there will be a suitable engagement with the sprockets so that the chain may operate efficiently in either direction.

With the external surface 12 engaging the sprockets, under a reversal of stress there may be a tendency for the rocker member to slip transversely relative to the face of the seat-pin and there is also a slight lever action upon the links when engaged by the driving sprockets, which action may tend to produce a similar transverse slipping movement between the parts of the pintle, one relative to the other. In order to counteract any such tendency and to prevent any such relative slipping movement between the parts of the pintle, the seat-pin is preferably tipped at a slight angle, say from three to five degrees, from a perpendicular to the normal line of pull, this line being indicated in Fig. 2 by $a$—$a$, the perpendicular by line $c$—$c$, and the plane of the bearing face of the seat-pin by the line $b$—$b$. The plane bearing faces of the seat-pins may still be regarded as all facing in the same direction and as substantially at right angles to the line of pull although inclined at a very small angle. This slight tipping of the seat-pins corrects any tendency to slip in the joints and increases the efficiency and durability of the chain.

The apertures in the plates of each of the two adjacent links at each joint are formed to hold in place one part of the pintle and provide clearance for the free movement of the other part, the parts bearing upon each other and extending through all of the plates of both links. While the same shaped apertures may be employed for all of the link plates if desired, I prefer to construct the seat-pin and rocker with shoulders 9 and 10 respectively where they pass through the outside plates 2, and to form the apertures 5 and 6 in these outside plates to correspond with the shape of the shoulders as shown in Figs. 2 and 4. Then at each alternate joint the shouldered ends 9 of the seat-pins may be extended and riveted to outside washers 14, while at the other intermediate joints the shouldered ends 10 of the rockers may be extended and riveted through outside washers 15. In this manner the seat-pins and rockers are riveted at the joints alternately, and all outside washers are riveted to the pintle part which turns with the outside plate at each joint so that there is no relative movement between the washers and the outside link plates against which they are riveted.

By forming shoulders upon the ends of the pintle parts the apertures in the outside plates may be made smaller so as to be readily covered by the washers, and said plates may be rigidly riveted up against the shoulders of the respective pintle parts at each joint either with or without the outside washers thereby increasing the strength and durability of the construction.

Having now described my invention, what I claim as new and desire to secure by Letters Patent is:—

1. A drive chain having links composed of a plurality of plates, the plates of one link being interspersed with the plates of the adjacent link, and the plates of each link having an external engaging surface and an internal engaging surface for the sprockets at one end of the link, and an external engaging surface at the other end.

2. A drive chain having links composed of a plurality of arched plates, pintles for connecting said links, the plates of each link being interspersed upon the pintles with those of the adjacent link, and the plates of each link having external engaging surfaces at both ends for the sprockets, and an internal engaging surface at one end.

3. A drive chain having links composed of a plurality of plates adapted to arch over the sprockets, pintles connecting said links, the plates of each link being formed with an outside engaging surface at one end for the sprockets, and with an inside engaging surface and an outside engaging surface at the other end of the link.

4. A drive chain having links composed of a plurality of plates adapted to arch over the sprockets, pintles connecting said links, the plates of each link being formed with external engaging surfaces at both ends for the sprockets, and an internal engaging surface at one end extending slightly beyond the corresponding ends of the plates of the adjacent link.

5. A drive chain having links composed of a plurality of arched plates, the plates of one link being interspersed upon the pintles with the plates of the adjacent link, pintles formed in two parts carried by the respective links and bearing upon each other, the plates of each link having external engaging surfaces at both ends for the sprockets and also an internal engaging surface at one end.

6. A drive chain having the links joined by two-part pintles comprising a seat-pin and rocker, the seat-pins having substantially plane bearing surfaces all facing in the same direction and tipped at a slight angle from a perpendicular to the line of pull.

7. A drive chain having the links joined by two-part pintles comprising a seat-pin and rocker, the seat-pins having substantially plane bearing surfaces inclined at a slight angle from a perpendicular to the line of pull.

8. A drive chain having links composed of a plurality of plates, and pintles formed in two parts comprising a seat-pin and rocker, the seat-pins having substantially plane bearing surfaces inclined at a slight angle to the line of pull.

9. A drive chain having links composed of a plurality of plates, and pintles formed in two parts comprising a seat-pin and rocker, the seat-pins having substantially plane bearing surfaces inclined at a slight angle to the line of pull and all facing in the same direction.

10. A drive chain having links composed of a plurality of plates, and two-part pintles comprising a seat-pin and rocker, the seat-pins and rocker-pins being riveted alternately at the joints.

11. A drive chain having links composed of a plurality of plates, two part pintles comprising a seat-pin and rocker, and washers riveted to the seat-pins and to the rocker pins alternately at the joints.

12. A drive chain having links composed of a plurality of plates provided with apertures at their ends, two-part pintles, comprising a seat-pin and rocker, extending through the apertures of said plates, the seat-pins having shouldered ends extending through the apertures in the outside link plates, and washers riveted to the shouldered ends of the seat-pins at each alternate joint.

13. A drive chain having links composed of a plurality of plates provided with apertures at their ends, two-part pintles, comprising a seat-pin and rocker, extending through the apertures of said plates, the rocker-pins being shouldered at their ends, and washers riveted to the rocker-pins at alternate joints.

14. A drive chain having links composed of a plurality of plates provided with apertures at their ends, two-part pintles, comprising a seat-pin and rocker, extending through the apertures of said plates, both seat-pins and rocker-pins being shouldered in the outside link plates, and washers riveted to the shouldered ends of said seat-pins and rocker-pins alternately at the joints.

15. A drive chain having links composed of a plurality of plates adapted to arch over the sprockets, the plates of each link being formed to engage the sprockets at both outside ends and also at one end by inside engagement.

In testimony whereof I have hereunto set my hand.

FRANK L. MORSE.

Witnesses:
R. F. EMERY,
WM. M. CODY.